72X
Eli Whitney.
Cotton Gin
Patented March 14 1794
Fig: 1.
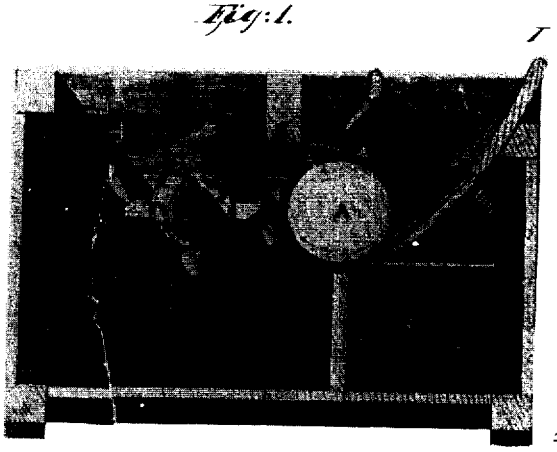
Fig: 21.
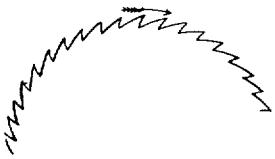
Fig: 22.
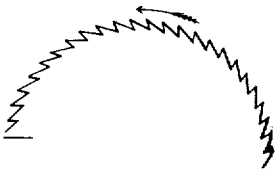
Fig: 23.
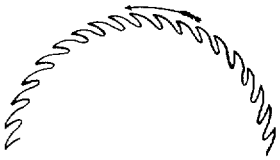
Fig: 24.
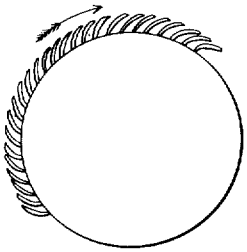
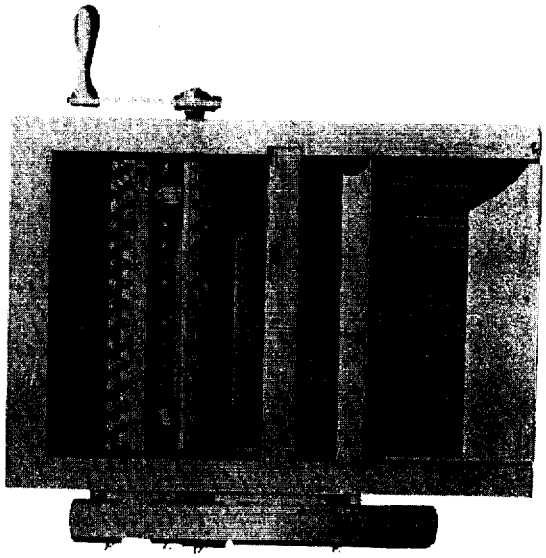
Fig: 25.
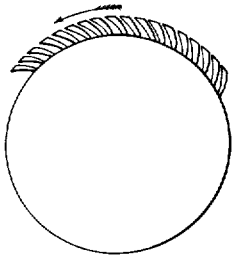
Fig: 20.
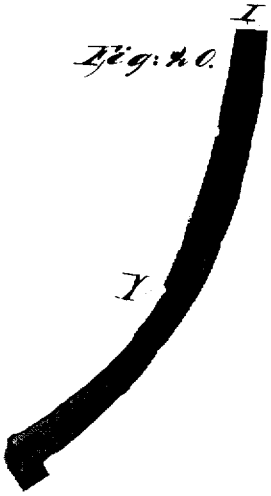

72X
2 Sheets-Sheet 2.
E. Whitney,
Cotton Gin.
Patented Mar. 14, 1794.
Fig: 3.
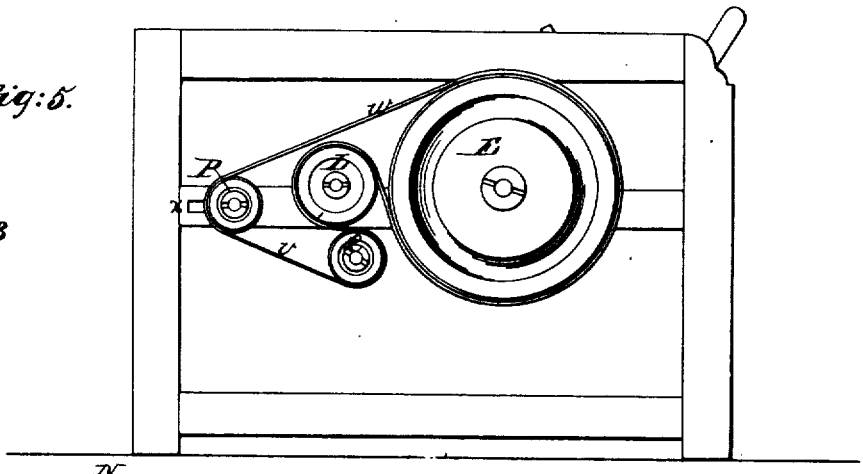
Fig: 5.
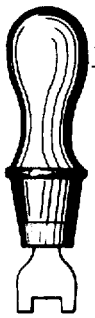
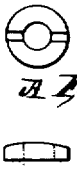
A Fig: 5
Fig: 14.
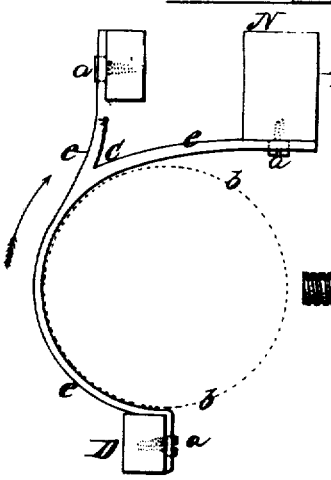
Fig: 7.
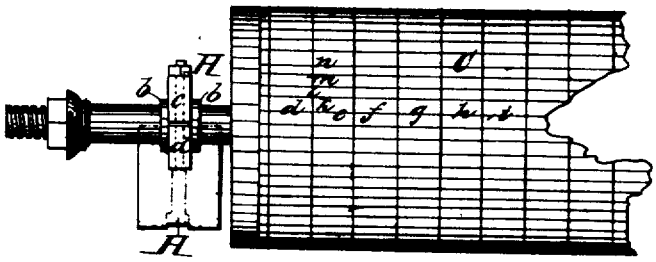
Fig: 4.
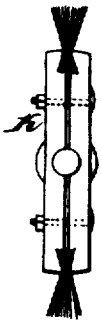
Fig: 11.
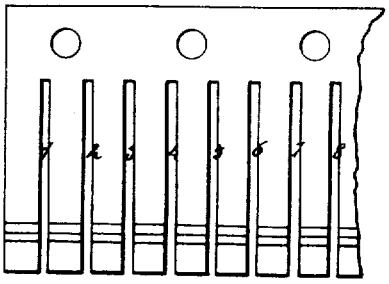
Fig: 12.
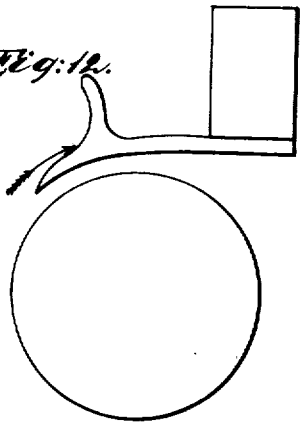

Eli Whitney.

To all to whom these presents shall come, Greeting:

I Certify, That the annexed Writings and Drawings are True Copies of Original papers deposited in this Office by Eli Whitney and still remaining therein:

In faith whereof, I James Madison Secretary for the Department of State of the United States of America, have signed these presents, and caused the Seal of my Office to be affixed hereto, at the City of Washington, this Twenty fifth day of November, A.D. 1803, and in the Twenty eighth year of the Independence of the said States.

S.S.

James Madison

Discription of a New Invented Cotton Gin; or Machine for cleaning and separating Cotton from its Seeds.

This Machine may be described under five divisions, corresponding to its five principal parts: viz. 1st, The frame; 2, the cylinder; 3, the breastwork; 4, the cleaner; and 5, the hopper.

1st. The frame, by which the whole work is supported and kept together, ought to be made of well seasoned timber, so that it may be firm and steady, and never become loose in the joints. Scantling four inches by three, will perhaps be stiff, of as suitable size as any. The frame should be of a square or parallelogramic form, the width must answer to the length of the cylinder and the height and length may be proportioned as circumstances shall render convenient.

In the Drawing annexed, Fig. 1, is a section of the machine. A represents the cylinder, B, the breastwork, C, the cleaner, and D, the hopper.

II. The cylinder is of wood; its form is perfectly described by its name; and its dimensions may be from six to nine inches diameter, and from two to five feet in length. This cylinder is placed horizontally across the frame, in such manner as to give room for the cleaner on one side of it, and the hopper on the other, as in Fig. 1.

Its height, if the machine is worked by hand should be about three feet four inches; otherwise it may be regulated by convenience. In the cylinder is fixed an Iron axis, so large as to turn in the lathes without quivering. The axis may pass quite through the cylinder or consist only of gudgeons, drawn with cement into each end. There must be a shoulder at b, Fig. 2, on each side the bearing or box to prevent any horizontal variation in the cylinder. The bearings of the axis, or those parts which rest on the boxes must be rounded in a lathe, so that the centre of the axis may coincide with the centre of the cylinder. One end of the axis should extend so far without the frame as to admit the winch, by which it is turned, to be connected with it at C, and so far at the other end as to receive the whirl designed for putting the cleaner in motion.

The brass boxes in which the axis of the cylinder runs, consist each of two parts, c, & d, Fig. 7. The lower pail, d, is sunk into the wood of the frame to keep it firm and motionless; and the upper, c, is kept in its place by 2 small iron bolts, H, H, headed on the lower end at H. These bolts are inserted into the underside of the pail or scantling of the frame and continued up through both parts of the box. A portion of the bolts, as H, a, should be square, to prevent them from turning. The upper part of the box, c, is screwed down close, with a nut on the end of each bolt. At e, is a perforation for conveying oil to the axis.

After the cylinder, with its axis, is fitted and rounded with exactness, the circular part of its surface is filled with teeth set in annular rows. The spaces d, e, f, g, h, Fig. 2, between the rows of teeth, must be so large as to admit a cotton seed to turn round freely in them every way: and ought not to be less than seven sixteenths of an inch. The spaces k, l, m, n, &c. Fig. 1. between the teeth, in the same row, must be so small as not to admit a seed or a half seed: they ought not to exceed one twelfth of an inch; and I think about one sixteenth of an inch the best.

The teeth are made and set in the following manner.

Take common iron wire* about No. 12, 13, or 14. Draw it about three sizes less without nealing in order to stiffen it. Cut it into pieces four or five feet in length and straighten them. Then with a machine, somewhat like that used for cutting nails, cut the wire into pieces about an inch long. In the jaws of this machine at, O, Fig. 10, are fixed the two pieces of steel, d, d, which are pressed together as may be observed from the figure, by the operation of a compound lever. These pieces of steel are so set in, that upon being pressed together their approaching surfaces, meet only on the side next to, d, d, leaving between them a wedgelike opening, which enlarges, as the distance from the place of contact increases. On the side d, d, about an inch distant from the place of contact

* Steel wire would perhaps be best, if it were not too expensive.

and in any other kinds of wood there are spaces between the grains which are not so hard as the grains themselves: and the teeth driven into those spaces would not stand sufficiently firm, while the grains are so hard as to prevent the teeth from being driven without bending.

III. The breastwork, Fig. 11, and B, Fig. 1, & fig. 2, is fixed above the cylinder, parallel and contiguous to the same. It has transverse grooves or openings 1, 2, 3, 4, &c. through which the rows of teeth pass as the cylinder revolves: and its use is to obstruct the seeds while the cotton is carried forward through the grooves by the teeth. That side of the breastwork next the cylinder should be made of Brass or Iron that it may be the more durable. Its face or surface a, x, Fig. 1, ought to make an angle with the tangent, x, z, less than 30 Degrees. A tooth in passing from k, up to the breastwork B, fastens itself upon a certain quantity of cotton, which is still connected with its seeds. The seeds being too large to pass thro' the breastwork are thus stopped, while the cotton is forced thro' the groove and disengaged from the seeds. Now if the point of the tooth enters the groove before the root, or that part next the cylinder, it carries the cotton which it has collected in coming from k; but if the root of the tooth enter the groove before the point, part of the cotton fastened on it will slide off: and this latter case is preferable as it helps to give the cotton a rotary motion in the hopper. The thickness of the breastwork, or the distance from a, to i, Fig. 1, should be about 2½ or 3 inches, in proportion to the length of the cotton. It should be such that the cotton which is carried thro' by the teeth, may be disconnected from that which is left in the hopper before it leaves the grooves; otherwise that which is carried partly through the breastwork will, by the motion of that with which it is connected in the hopper, become so collected and knotted at i, as to obstruct and bend the teeth. *

The under part of the breastwork next the cylinder ought, as has before been observed, to be made of Iron or brass. It may be cast either in a solid piece and the openings for the passage of the teeth cut with a saw and files; or in as many parts as there are spaces between the several rows of teeth in the cylinder and in form of Fig. 12, and the pieces set, by means of a shank or tenon, in a groove running lengthwise along the wooden part of the breastwork.

The breastwork described, if properly constructed, will it is thought answer every valuable purpose. But I shall mention one of a different construction which I have

* A perforation about $\frac{3}{16}$ of an inch be made thro' the breastwork at the upper part, near end of each groove; the metal part need not be more than $\frac{3}{16}$ of an inch thick.

is fixed a gauge. The wire is inserted on the side opposite d, d, and thrust thro' to the gauge. Then on forcing down the levers, the wire is separated, leaving that end of the wire next the side d, d, cut smoothly and transversely off, and the end of the other part flatted like a wedge. The flatted end is then thrust forward to the gauge and the same operation is repeated. In this manner the teeth are cut of equal length, with one end flatted and the other cut directly off. Flatting one end of the wire is beneficial in two ways: 1st. The flatted ends of the teeth are driven into the wood with ease and exactness; and 2, it prevents them from turning after they are set. To prevent the wires from bending, while driving, they are holden with pliers the jaws of which ought to be about half an inch in width, with a corresponding transverse groove in each jaw. Thus holden the teeth are, with a light hammer, driven, one by one into the cylinder, perpendicular to its axis. Then, with a tool, like a chissel or common screw driver, each tooth is inclined directly towards the tangent to that point of the circle into which it is set, till the inclination is such that the tooth and tangent form an angle of about 55 or 60 Degrees. If this inclination be greater, the teeth will not take sufficient hold of the cotton; if it be less there will be more difficulty in disengaging the cotton from the teeth, after it is separated from the seeds.

When the teeth are all set they should be cut of an equal length. In order for this take a crooked gauge, Fig. 8, having two prongs, q, r; the curvature of which correspond with that of the cylinder. This gauge is merely a crooked fork, the thickness of whose prongs or tines, as represented between s & t, Fig. 9, equalizes the length of the teeth, and is applied to the cylinder with one tine on each side of an annular row. With a pair of cutting pliers, cut the teeth 1, 2, 3, &c. off even with the gauge, then slide it along to 6, 7, 8, &c. and so proceed till you have trimmed all the teeth to an equal length. This done put the cylinder into a lathe and with a file bring the teeth to a kind of angular point, resembling a wire flatted and cut obliquely. After the teeth are brought to a proper shape, smooth them with a polishing file and the cylinder will be finished.

Remarks. Though the dimensions of the cylinder may be varied at pleasure, yet it is thought that those described are the best, being more easily made and kept in repair than those of a larger size. The timber should be quarter stuff, i.e. a quarter of the trunk of the tree, otherwise, it will crack in seasoning. It must also be wood of an equal density, such as beech, maple, black birch, &c. Iron or in each of the before mentioned channels.

The boxes as well as axis of the cleaner, are like those of the cylinder. The cleaner is placed horizontal with the cylinder, parallel to it and at such a distance, that which it revolves the ends of the bristles strike with a small degree of friction on the cylinders surface. Its use is to brush the cotton from the teeth after it is forced thro' the grooves and separated from its seeds. It turns in a direction contrary from that of the cylinder, and should so far outrun it, as completely to sweep its whole surface. †

A cleaner with two brushes may be made by simply screwing upon the axis the board K, Fig. 1, and another similar board on the opposite side, which leaves spaces for the insertion of the brushes s, s. The cleaner may also be formed of a cylinder with grooves running lengthwise in it for the reception of the brushes or in any other way, which may be convenient.

The number of brushes in the cleaner is not material; let it be observed that the distance from e, to e, Fig. 1, between the brushes, must be at least 4, or 5, inches; otherwise the cotton will wind up round the cleaner. The surface of the cleaner moving much faster than that of the cylinder; the brushes sweep off the cotton from the teeth. The air put in motion by the cleaner and the centrifugal force of the cotton disengage it from the brushes. Note, It is best to set the brushes in the grooves in such a manner that the bristles will make an angle of 20 or 25°, with the diameter of the cleaner, in the direction, e, o, Fig. 1, by that means the bristles fall more perpendicularly, on the teeth, strike them more forcibly, and clear off the cotton more effectually.

The cleaner is put in motion by the cylinder, by means of a band and whirls. These whirls are plain wheels of solid wood about 2½ or 3 inches thick. Their periphery is a spherical surface swelling out the centre, and sloping off at the edges. To give them the proper shape, take a perfect globe of the same diameter as your intended whirl; inscribe upon it a circle dividing it into two equal parts; then cut the globe on each side, parallel to the plane of this circle, and at the distance from it of half the thickness of your whirl. On these whirls runs a leather band, the breadth of which answers to the thickness of the whirls. The band may be broader or narrower and the whirls thicker or thinner in proportion as the resistance to be † The brushes may be fixed in a stock which is moveable by screws so as to bring them nearer or carry them further from the cylinder used with success, and is made in the following manner:

Form a breastwork of the same shape and dimensions as the one before described, entirely of wood. Place a bar of wood one inch below the cylinder and parallel to it. Then with straps or ribs of iron, brass or tin plate, connect the breastwork of wood with the bar below. The ribs or straps must be so applied as to sit close to the surface of the cylinder between the wooden breastwork and the bar, and of a width that will permit them to work freely between the annular rows of steel. That end of each strap which is fastened to the breastwork should divide widthwise into two parts, one of which should pass along the lower surface of the breastwork and the other run up its front. In Fig. 14, B, is the wooden breastwork; D the bar below the cylinder; the dotted circle b, b, the cylinder; c, c, the straps; e the place where the strap divides, and a, a, a, wood screws or nails with which the strap is made fast to the bar & breastwork. N. The cleaner, C, Fig. 1, is constructed in the following manner: Take an iron axis perfectly similar to that described as extending through the cylinder, except that it need not be so large nor fitted for the application of a wench. Frame together crosswise at right angles two pieces of timber of suitable size and of a length about equal to the diameter of the cylinder, so as to make the four arms equal in length, and insert the axis thro' the centres of two crosses or frames of this kind. Set their distance from each other be one third of the length of the cylinder and make them fast on the axis. The arms of the two crosses are then connected by four pieces of the same length of the cylinder, equidistant from the axis, and parallel to the same, and to each other. In each of the parallel pieces, on the outside or side opposite the axis, a channel is made lengthwise for the reception of a brush. The brush is made of hog's bristles, set in a manner somewhat similar to that of selling reeds in a weavers sley. Between two strips of wood about ⅛ of an inch in thickness and half an inch in breadth, is placed a small quantity of bristles; then a strong thread or twine is wound round the sticks close to the bristles: then another quantity of bristles is inserted, &c. till a brush is formed equal in length to the cylinder. * The bristles on the side a, a, Fig. 6, are smeared with pitch or rosin and seared down with a hot iron even with the wood, to prevent them from drawing out. On the other side they are cut with a chisel to the length of about an inch from the wood. A brush of this kind is fixed

* Perhaps nailing these straps together, would be better than winding them with twine.

overcome is greater or less. The reason for giving the whirls this shape is to secure them the better from being unbanded. A band of this kind always inclines to the highest place on the whirl, and is much less liable to be cast off from the work, when it runs on a spherical surface, than when it runs in a groove in the periphery of the whirl.

The whirls are four in number, and must be so arranged as to make their central planes coincident. The whirl E, Fig. 3, is fixed upon the end of the axis of the cylinder without the frame, and the button A, Fig. 3, is screwed on with the screw Driver B, to keep the whirl in its place. I, is put upon the axis of the clearer in the same manner. P, Q, whose axis are pivots made fast in the frame, are false whirls added for two purposes; 1st to make the clearer turn in a contrary direction from the cylinder, 2d for the purpose of doubling the band more completely round the small whirl I, so as to bring a greater portion of the whirl's surface into contact with the band, increase the friction and consequently turn the whirl more forcibly. The first of these purposes might by accomplished by the addition of one false whirl, but the second not so fully without two. The dotted line, r, r, represents the band. The diameters of the whirls E, I, should be so proportioned as to produce a proper degree of velocity in the clearer. This axis of the whirl Q, is fixed in a plate of Iron which is movable in a groove in the side of the frame, and the band is made tighter or looser by moving the plate. This arrangement of whirls produces the same movement as a cog wheel and pinion, with much less friction and expence, and without the rattling noise which is always caused by the quick motion of cog-wheels. V, One side of the hopper is formed by the breastwork, the two ends by the frame, and the other side is movable so that, as the quantity of Cotton put in at one time, decreases, it may slide up nearer the cylinder, and make the Hopper narrower. This is necessary in order to give the seeds a rotary motion in the hopper, by bringing them repeatedly up to the cylinder, till they are entirely stripped of the cotton. D, Fig. 1, is a section of the movable part of the hopper. The part from H to I, should be concave on the side next the breastwork, or rather it should be a portion of a hollow cylinder. Between H and Y, is a crate of wire thro' which the sands and the seeds, as soon as they are thoroughly cleansed, fall into a receptacle below. The crate may be either fixed in the frame or connected with the movable part of the hopper. The wires of which the crate is made should be large and placed perpendicular to the cylinder, that the cotton may turn the more easily in the hopper.

A few additional remarks will sufficiently shew the construction, use and operation of this machine.

The Cotton is put into the hopper I, D, H, k, a, a, s, Fig. 1, in as large a quantity as the cylinder will put in motion. Some of the seeds become stripped sooner than others. If it be black seed cotton, the seeds, being smooth, will most of them fall through the grate as soon as they are clean; but a considerable part of the green seeds, which are thus denominated from being covered with a kind of green coat, resembling velvet, will continue in the hopper. It will not answer therefore to supply it gradually as the quantity in it diminishes, because the seeds will soon grow cumbrous, and by their constant intervention prevent the teeth from attaching themselves to the cotton so fast as they otherwise would: but one hopper full must be finished, the moveable part drawn back, the hopper cleared of seeds and then supplied with cotton anew. There is a partition y, x, under the cylinder; on the left hand of which, or the side beneath the hopper, the seeds fall, and the clean cotton on the other side. There may be a receptacle for the clean cotton in the frame: but it is best to have an opening through the wall or partition into a contiguous room; then place the end of the machine against this opening and let the cotton fly into a close room, Or it may fall through an opening in the floor into a room below. This machine may be turned by horses or water with the greatest ease. It requires no other attendance than putting the Cotton into the hopper with a basket or fork, narrowing the hopper when necessary, and letting out the seeds after they are clean. One of its peculiar excellencies is, that it cleanses the kind called green seed cotton, almost as fast as the black seed. If the machinery is moved by water, it is thought it will diminish the usual labour of cleaning the green seed cotton at least forty nine fiftieths.

The foregoing is a Description of the machine for cleansing cotton, alluded to in a Petition of the Subscriber, Dated Philadelphia, June 20th 1793, and lodged in the Office of the Secretary of State, alledging that he the Subscriber is the inventor of said Machine, and signifying his desire of obtaining an exclusive property in the same.

Signed in presence of

Eli Whitney

Chauncey Goodrich, Counsellor at Law, Hartford

John Allen, Counsellor at Law, Litchfield

State of Connecticut ss. City of New Haven.

I, Elizur Goodrich, Esq^r. Alderman for said City, and Notary Public, by Sanction authority admitted and sworn, residing in said City, and by Law authorized to administer Oaths, Do hereby certify, declare and make known to whom it doth or may concern: That, at said City, on this twenty eighth day of October one thousand seven hundred and ninety three, Eli Whitney, of the County of Worcester in the Commonwealth of Massachusetts now resident in said City, personally appeared before me, the said Alderman and Notary, and made solemn oath, that he does verily believe that he the said Whitney is the true inventor and discoverer of the machine for Ginning Cotton, a Description whereof is hereto annexed by me the said Alderman and Notary by my Seal Notarial, and that he the said Whitney verily believes that a machine of similar construction hath never before been known or used.

In testimony whereof I the said Alderman and Notary have hereunto set my hand and seal at the City aforesaid on the day above said.

S.S.

Elizur Goodrich, Alderman & Not^y Public (4405 words)

Received & Recorded May Second 1794. & Exd. NGB.

Drawn, ex^d. Search'd by DR.